(12) United States Patent
Sugiura

(10) Patent No.: US 11,521,244 B2
(45) Date of Patent: Dec. 6, 2022

(54) INFORMATION PROCESSING DEVICE, INFORMATION PROCESSING METHOD, AND INFORMATION PROCESSING PROGRAM

(71) Applicant: Rakuten Group, Inc., Tokyo (JP)

(72) Inventor: Kenji Sugiura, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 482 days.

(21) Appl. No.: 14/778,718

(22) PCT Filed: Mar. 29, 2013

(86) PCT No.: PCT/JP2013/059560
§ 371 (c)(1),
(2) Date: Sep. 21, 2015

(87) PCT Pub. No.: WO2014/155681
PCT Pub. Date: Oct. 2, 2014

(65) Prior Publication Data
US 2016/0055545 A1 Feb. 25, 2016

(51) Int. Cl.
*G06Q 30/00* (2012.01)
*G06Q 30/02* (2012.01)
*G06F 16/958* (2019.01)

(52) U.S. Cl.
CPC ....... *G06Q 30/0277* (2013.01); *G06F 16/972* (2019.01); *G06Q 30/02* (2013.01); *G06Q 30/0275* (2013.01)

(58) Field of Classification Search
CPC .......... G06Q 30/00–30/0284; G06Q 30/0277; G06Q 30/02; G06Q 30/0275; G06F 16/972
See application file for complete search history.

(56) References Cited

U.S. PATENT DOCUMENTS

| 8,205,167 B2* | 6/2012 | Kang | G06Q 30/0254 |
| | | | 709/227 |
| 9,311,648 B2* | 4/2016 | Mitsui | G06Q 30/0273 |
| 2012/0246003 A1* | 9/2012 | Hart | G06Q 30/0267 |
| | | | 705/14.57 |

FOREIGN PATENT DOCUMENTS

| JP | 2007-286833 A | 11/2007 |
| JP | 2008-083803 A | 4/2008 |

OTHER PUBLICATIONS

Christina Uhl, How Much Ad Viewability is Enough? The Effect of Display Ad Viewability on Advertising Effectiveness, p. 28 (Year: 2020).*

* cited by examiner

*Primary Examiner* — Michael Bekerman
*Assistant Examiner* — Darnell A Pouncil
(74) *Attorney, Agent, or Firm* — Sughrue Mion, PLLC

(57) ABSTRACT

An information providing device acquires a keyword specified from a page on which an advertisement display area used for displaying an advertisement is arranged, selects advertisements corresponding to the keyword from a storing means storing information of each of a plurality of advertisements as display target candidates, and specifies a display target advertisement to be displayed in the advertisement display area of the page from among the display target candidates. Then, the information providing device, in a case where the display target candidate that is not specified among the display target candidates of a same advertiser as that of the specified display target advertisement satisfies a predetermined condition, determines the display target candidate and the display target advertisement as display target advertisements to be displayed in the advertisement display area.

22 Claims, 5 Drawing Sheets

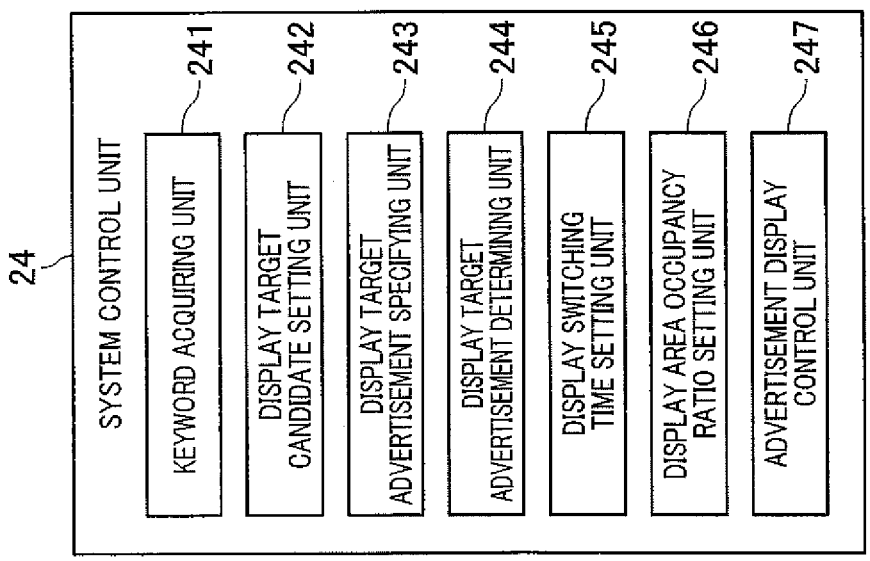
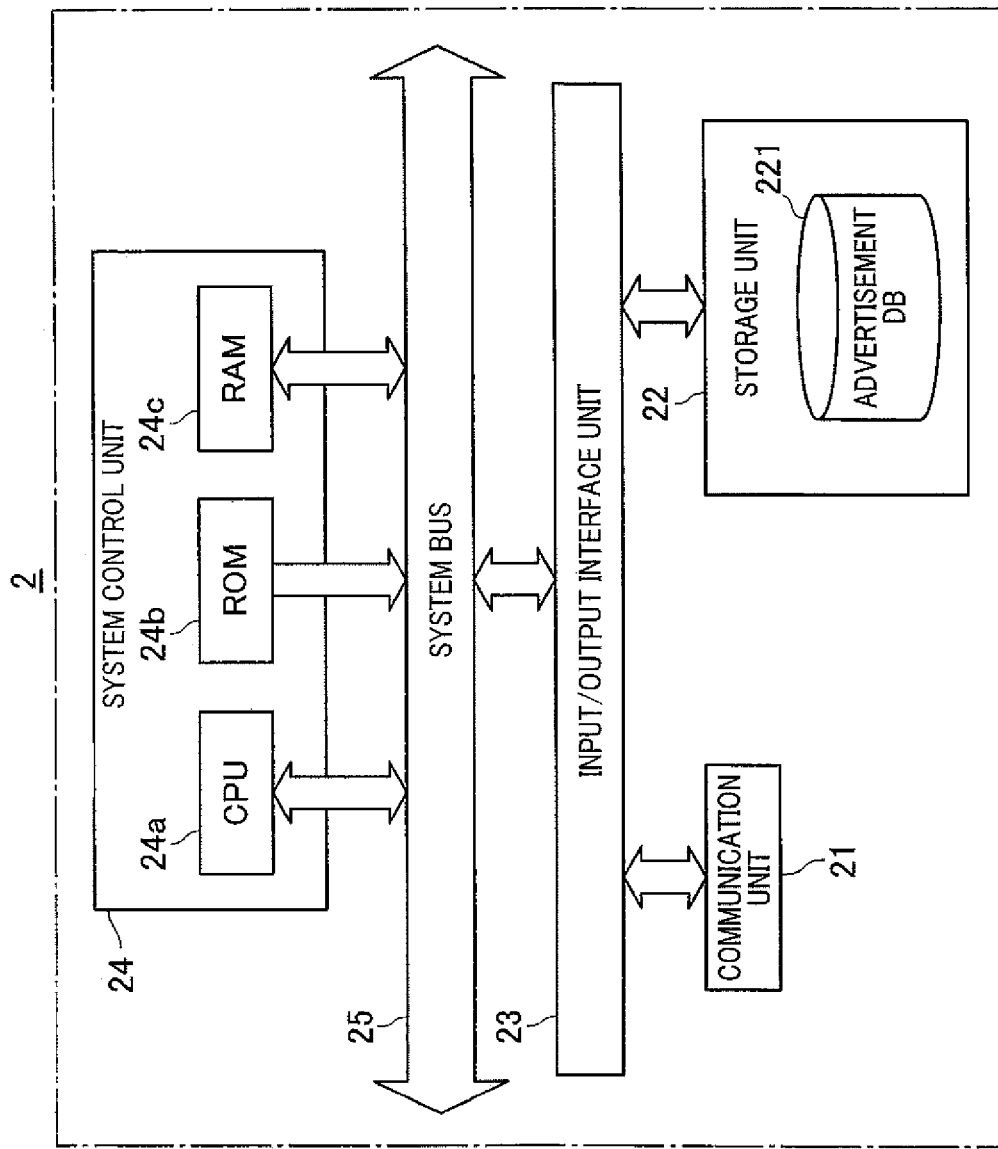

INFORMATION PROCESSING DEVICE, INFORMATION PROCESSING METHOD, AND INFORMATION PROCESSING PROGRAM

CROSS REFERENCE TO RELATED APPLICATIONS

This application is a National Stage of International Application No. PCT/JP2013/059560 filed Mar. 29, 2013, the contents of which are incorporated herein by reference in its entirety.

TECHNICAL FIELD

The present invention relates to a technical field of a system capable of providing an advertisement associated with a content included in a web site or an advertisement associated with a search keyword to a user and the like.

BACKGROUND ART

Conventionally, an advertisement distribution system capable of providing an advertisement associated with a content included in a web site has been known (for example, Patent Literature 1). In such a system, a keyword or a topic is extracted from an advertisement placement target content of a web site in which an advertisement is placed, and, in a case where an access to the advertisement placement target content is requested by a reader from a terminal, a search for an advertisement is executed using the keyword or the topic that has been extracted, and a content to which an advertisement is attached is provided for the reader's terminal. In addition, a system capable of providing an advertisement associated with a search keyword for a user has been known (for example, Patent Literature 2). In such a system, when a user terminal accesses an advertisement medium site through a search site, an advertisement content on which a search keyword given to a search engine is reflected is presented to the user terminal.

CITATION LIST

Patent Literature

Patent Literature 1: JP 2007-286833 A
Patent Literature 2: JP 2008-83803 A

SUMMARY OF THE INVENTION

Problem to be Solved by the Invention

However, the advertisement described above is placed in an advertisement display area set as an advertisement frame at a predetermined position on a web page displayed on the terminal. However, it is difficult for an advertiser to secure many advertisement frames for placing an advertisement of the advertiser.

The present invention is devised in consideration of the above described points and the like, and an object thereof is to provide an information processing device, an information processing method, and an information processing program capable of effectively using an advertisement frame secured by an advertiser.

Means for Solving the Problem

In order to solve the above problem, the invention of claim 1 is an information processing device comprising:

an acquiring means that acquires a keyword specified from a page on which an advertisement display area used for displaying an advertisement is arranged;

a selecting means that selects advertisements corresponding to the keyword acquired by the acquiring means from a storing means storing information of each of a plurality of advertisements as display target candidates;

a specifying means that specifies a display target advertisement to be displayed in the advertisement display area of the page from among the display target candidates selected by the selecting means; and a determining means that, in a case where the display target candidate that is not specified by the specifying means among the display target candidates of a same advertiser as that of the display target advertisement specified by the specifying means satisfies a predetermined condition, determines the display target candidate and the display target advertisement as display target advertisements to be displayed in the advertisement display area.

According to this invention, an advertisement frame secured by an advertiser can be effectively used.

The invention of claim 2 is the information processing device according to claim 1, wherein, in a case where the display target candidate that is not specified by the specifying means is another advertisement to be displayed in an advertisement display area different from the advertisement display area in which the display target advertisement is displayed and satisfies a condition of being in a competitive relation with the another advertisement of another advertiser different from the advertiser of the display target candidate, the determining means determines the display target candidate and the display target advertisement as display target advertisements to be displayed in the advertisement display area.

According to this invention, in a case where an advertisement that is in a competitive relation with an advertisement that is not specified as a display target advertisement is specified as a display target advertisement, the occurrence of a disadvantage according to no-display of the advertisement that is not specified can be prevented.

The invention of claim 3 is the information processing device according to claim 2, wherein, in the condition of being in the competitive relation, a condition that a rank of the another advertisement, which is ranked based on a predetermined sorting criterion, is higher than a rank of the display target candidate that is not specified by the specifying means, is included.

According to this invention, the range of the competitive relation can be limited.

The invention of claim 4 is the information processing device according to claim 2, wherein, in the condition of being in the competitive relation, a condition that a difference between a rank of the another advertisement, which is ranked based on a predetermined sorting criterion, and a rank of the display target candidate that is not specified by the specifying means is within a predetermined rank difference is included.

According to this invention, the range of the competitive relation can be limited.

The invention of claim 5 is the information processing device according to claim 2, wherein, in the condition of being in the competitive relation, a condition that a price range of a commodity that is a target for the another advertisement and a price range of a commodity that is a target for the display target candidate not specified by the specifying means are the same as each other is included.

According to this invention, the range of the competitive relation can be limited.

The invention of claim 6 is the information processing device according to any one of claims 1 to 5, wherein, in a case where a condition that a rank of the display target candidate, which is ranked based on a predetermined sorting criterion, and which is not specified by the specifying means is within a predetermined rank is satisfied, the determination unit determines the display target candidate and the display target advertisement as display target advertisements to be displayed in the advertisement display area.

According to this invention, an advertisement of a commodity within a predetermined rank in the ranking based on a predetermined sorting criterion can be displayed with high priority.

The invention of claim 7 is the information processing device according to any one of claims 1 to 5, wherein a score calculated based on the keyword is assigned to each of the plurality of advertisement, and wherein, in a case where a condition that a difference between the score of the display target advertisement specified by the specifying means and the score of the display target candidate not specified by the specifying means is within a predetermined value is satisfied, the determination unit determines the display target candidate and the display target advertisement as display target advertisements to be displayed in the advertisement display area.

According to this invention, the lower limit of ranks of the display target candidates that can be displayed among the ranking based on the score of the advertisement can be appropriately set.

The invention of claim 8 is the information processing device according to any one of claims 1 to 5, wherein, in a case where a condition that a difference between a bid amount of the display target advertisement specified by the specifying means and a bid amount of the display target candidate not specified by the specifying means is within a predetermined amount is satisfied, the determination unit determines the display target candidate and the display target advertisement as display target advertisements to be displayed in the advertisement display area.

According to this invention, the lower limit of ranks of the display target candidates that can be displayed among the ranking based on the bid amount of the advertisement can be appropriately set.

The invention of claim 9 is the information processing device according to any one of claims 1 to 8, wherein the plurality of the display target advertisements determined by the determining means are switched to be displayed in the same advertisement display area based on display switching time, and the information processing device further comprises a setting means that sets each of the display switching time based on a ratio among bid amounts of a plurality of the display target advertisements.

According to this invention, the higher an input amount of an advertisement is, the longer the display continuation time is, and accordingly, the advertisement can be read by a reader for a long time.

The invention of claim 10 is the information processing device according to any one of claims 1 to 8, wherein the plurality of the display target advertisements determined by the determining means are switched to be displayed in the same advertisement display area based on display switching time, and the information processing device further comprises a setting means that sets each of the display switching time based on a ratio among scores, which are calculated based on the keyword, and of a plurality of the display target advertisements.

According to this invention, the higher a score of an advertisement is, the longer the display continuation time is, and accordingly, the advertisement can be read by a reader for a long time.

The invention of claim 11 is the information processing device according to any one of claims 1 to 8, wherein the plurality of the display target advertisements determined by the determining means are displayed in the same advertisement display area in a divisional manner based on the occupancy ratios of the advertisement display area, and the information processing device further comprises a setting means that sets occupancy ratios of the advertisement display areas based on a ratio among bid amounts of a plurality of the display target advertisements.

According to this invention, the higher an input amount of an advertisement is, the larger the display area is, and accordingly, the advertisement can be read in an easily-viewable manner by a reader.

The invention of claim 12 is the information processing device according to any one of claims 1 to 8, wherein the plurality of the display target advertisements determined by the determining means are displayed in the same advertisement display area in a divisional manner based on the occupancy ratios of the advertisement display area, and the information processing device further comprises a setting means that sets occupancy ratios of the advertisement display areas based on a ratio among scores, which are calculated based on the keyword, and of a plurality of the display target advertisements.

According to this invention, the higher a score of an advertisement is, the larger the display area is, and accordingly, the advertisement can be read in an easily-viewable manner by a reader.

The invention of claim 13 is an information processing method executed by a computer, the information processing method comprising:

an acquisition step of acquiring a keyword specified from a page on which an advertisement display area used for displaying an advertisement is arranged;

a selection step of selecting advertisements corresponding to the keyword acquired in the acquisition step from a storing means storing information of each of a plurality of advertisements as display target candidates;

a specifying step of specifying a display target advertisement to be displayed in the advertisement display area of the page from among the display target candidates selected in the selection step; and a determination step of, in a case where the display target candidate that is not specified in the specifying step among the display target candidates of a same advertiser as that of the display target advertisement specified in the specifying step satisfies a predetermined condition, determining the display target candidate and the display target advertisement as display target advertisements to be displayed in the advertisement display area.

The invention of claim 14 is an information processing program that causes a computer to serve as:

an acquiring means that acquires a keyword specified from a page on which an advertisement display area used for displaying an advertisement is arranged;

a selecting means that selects advertisements corresponding to the keyword acquired by the acquiring means from a storing means storing information of each of a plurality of advertisements as display target candidates;

a specifying means that specifies a display target advertisement to be displayed in the advertisement display area of the page from among the display target candidates selected by the selecting means; and a determining means that, in a case where the display target candidate that is not specified by the specifying means among the display target candidates of a same advertiser as that of the display target advertisement specified by the specifying means satisfies a predetermined condition, determines the display target candidate and the display target advertisement as display target advertisements to be displayed in the advertisement display area.

Advantageous Effects of the Invention

According to the present invention, an advertisement frame secured by an advertiser can be effectively used.

BRIEF DESCRIPTION OF THE DRAWINGS

FIG. 3A is a block diagram that illustrates an example of the schematic configuration of an advertisement processing server 2 according to this embodiment, and FIG. 3B is a diagram that illustrates an example of functional blocks of a system control unit 54.

MODE FOR CARRYING OUT THE INVENTION

Hereinafter, an embodiment of the present invention will be described with reference to the drawings. The embodiment described below is an embodiment of a case where the present invention is applied to an information providing system.

[1. Configuration and Outline Function of Information Providing System]

Figure 1:
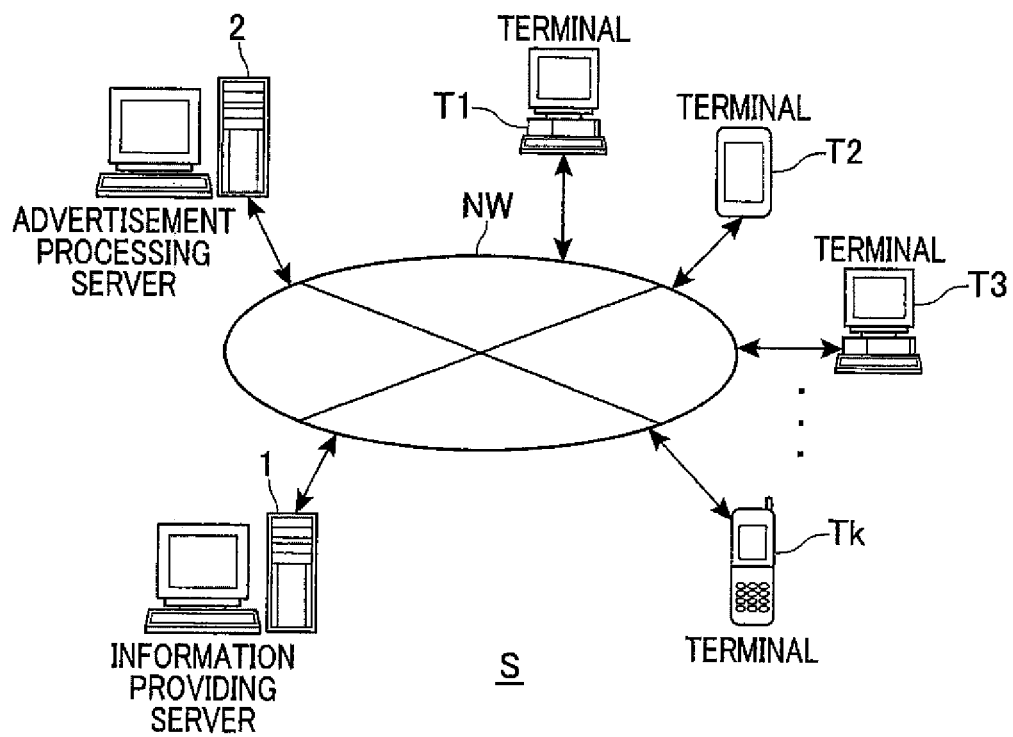
FIG. 1 is a diagram that illustrates an example of the schematic configuration of an information providing system S according to this embodiment.

First, the configuration and the outline function of an information providing system S according to this embodiment will be described with reference to FIG. 1. FIG. 1 is a diagram that illustrates an example of the schematic configuration of the information providing system S according to this embodiment. As illustrated in FIG. 1, the information providing system S is configured to include an information providing server 1, an advertisement processing server 2, and the like. The advertisement processing server 2 is an example of an information processing device according to the present invention. The information providing server 1 and the advertisement processing server 2 are connected to a network NW. The network NW, for example, is built by the Internet, a dedicated communication line (for example, a community antenna television (CATV) line), a mobile communication network (including a base station and the like), a gateway, and the like. In addition, terminals Tn (n=1, 2, 3, . . . k) are connectable to the information providing server 1 and the advertisement processing server 2 through the network NW. Furthermore, as the terminals Tn, for example, terminal devices such as a personal computer (PC), a mobile phone, a personal digital assistant (PDA), a smartphone combining a mobile phone and a mobile information terminal, and a mobile game device can be used. In addition, as users using the terminals Tn, there are a page manager to be described later, a reader, an advertiser, and the like.

The information providing server 1 is a server that provides a web site such as a blog site, a social networking service (SNS) site, or an information searching site. A unique uniform resource locator (URL) is assigned to each web site. On a web site such as a blog site or an SNS site, an article that can be displayed on a web page provided for the terminal Tn is registered. The article, for example, is configured by text data.

A web page provided from the web site is configured by a structured document such as a hypertext markup language (HTML) document or an XHTML document, image data, and the like. Among web pages, there are web pages each having a tag assigned for classifying and searching information handled in the web page embedded therein (described in the HTML document). The tag, for example, represents a category of a commodity (item) or the like. By designating a URL of a web site using a web browser, the terminal Tn displays a web page provided from the web site on a display screen (window screen) represented on a display. The user using the terminal Tn can read information displayed on the web page. In such a web page, at least, an advertisement display area used for displaying an advertisement of a product is arranged. Here, products refer to targets for transactions and include not only goods but also services and the like. In the services, various services such as a facility accommodation service and a use service are included. In the advertisement display area, a script for requesting the advertisement processing server 2 to distribute an advertisement, acquiring an advertisement (advertisement data) from the advertisement processing server 2, and embedding the advertisement in the advertisement display area is set. This script is configured using a predetermined script language (for example, JavaScript (registered trademark)) and is described inside a structured document configuring a web page. The advertisement provided from the advertisement processing server 2, for example, is configured by text data, image data, or the like. In addition, in the advertisement, a link (hyperlink) to a web site providing information of a commodity or a web site executing commodity order processing is set. Furthermore, for example, on a web page provided from a blog site, an article display area used for displaying (describing) an article registered by a supervisor (for example, a person who has established the blog site or the like) supervising the web page is arranged. In addition, other than the person who has established the blog site, for example, a user using a blog service provided by an operator of the blog site corresponds to a page supervisor as well. Furthermore, for example, on a web page provided from an information search site, an input field (hereinafter, referred to as a "keyword input field") for a keyword (search word) used by the user for searching desired information is arranged.

Figure 2:
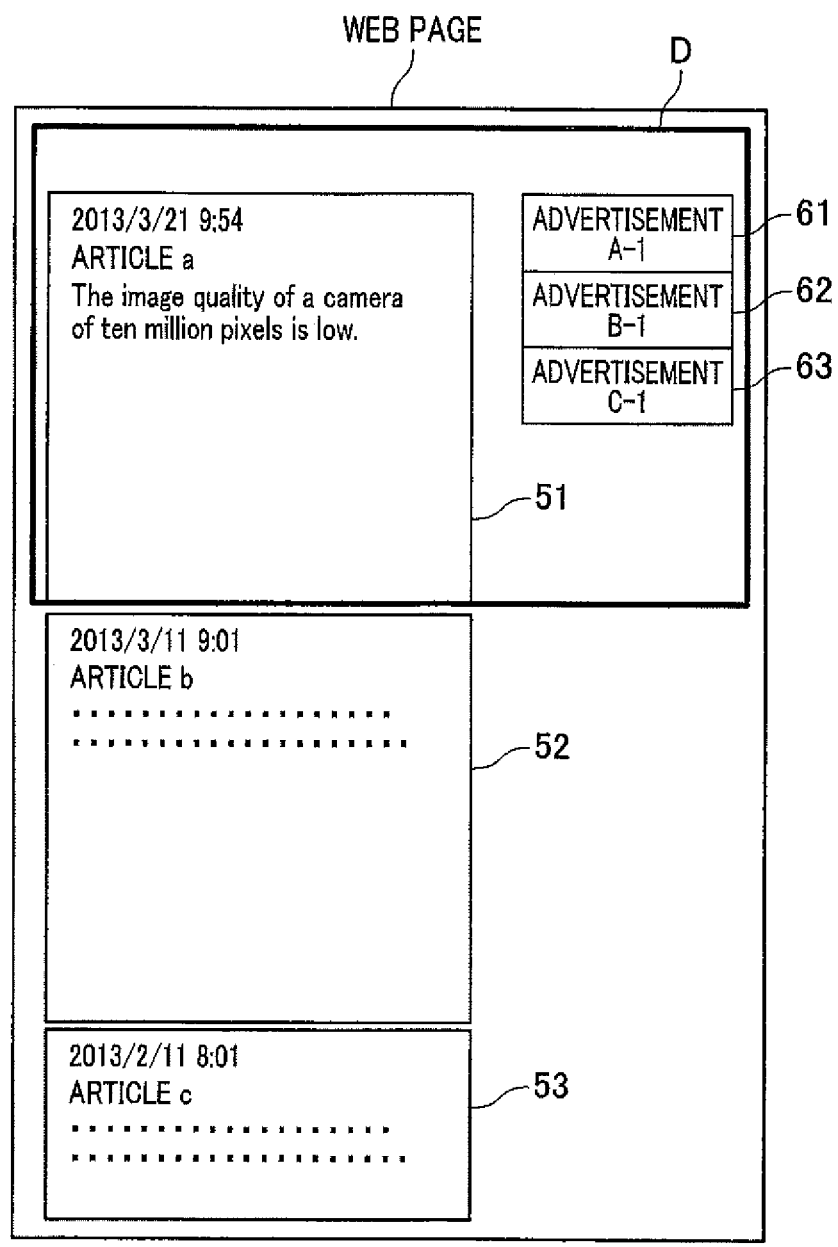
FIG. 2 is a diagram that illustrates an example of a web page on which article display areas and advertisement display areas are arranged.

FIG. 2 is a diagram that illustrates an example of a web page on which article display areas and advertisement display areas are arranged. In the example illustrated in FIG. 2, on the web page, a plurality of article display areas 51 to 53 and a plurality of advertisement display areas 61 to 63 are arranged. With each of the article display areas 51 to 53, registration date and time of an article displayed in the corresponding article display area is associated. As the registration date and time of an article is newer, the article is displayed in the article display area disposed on a further upper portion (a position displayed first) of the web page. More specifically, among articles a to c included in the web page illustrated in FIG. 2, the article a of which the registration date and time is the newest is displayed in the article display area 51 disposed in the uppermost portion of the web page. In addition, the article b of which the registration date and time is second newest is displayed in the article display area 52 disposed in a second uppermost portion of the web page, and the article c of which the registration date and time is third newest is displayed in the article display area 53 disposed in a third uppermost portion of the web page. In the example illustrated in FIG. 2, while the advertisement display areas 61 to 63 are adjacently arranged, the advertisement display areas 61 to 63 may be arranged at arbitrary display positions. In addition, as illustrated in FIG. 2, an area of the web page that cannot be completely fit into a display screen D of the terminal Tn is displayed on the display screen D as the screen is scrolled according to a scrolling operation executed by a registrant (page supervisor), a reader, or the like of the article. Accordingly, each of the article display areas 51 to 53 and the advertisement display areas 61 to 63 can be switched between an active state and a non-active state on the display screen D. Here, the active state represents a state of being displayed on the display screen D. An article display area that is in the active state can receive an article input by a registrant (page supervisor) of the article. Then, the article input by the registrant (page supervisor) of the article is registered in the web site providing the web page and is displayed in the article display area. In addition, the advertisement display area that is in the active state can receive a selection of an advertisement that is executed by the reader. In a case where an advertisement is selected by a reader, for example, a web page on which the information of a commodity is placed is displayed according to a link set in the selected advertisement. In addition, an area of the web page that cannot be completely fit into the inside of the display screen D of the terminal Tn may be configured to be acquired each time from the information providing server 1 according to a scrolling operation, for example, by using the technology of Ajax.

FIG. 3A is a block diagram that illustrates an example of the schematic configuration of the advertisement processing server 2 according to this embodiment. As illustrated in FIG. 3A, the advertisement processing server 2 includes a communication unit 21, a storage unit 22 (an example of a storing means), an input/output interface unit 23; a system control unit 24, and the like. The system control unit 24 and the input/output interface unit 23 are connected through a system bus 25. The communication unit 21 is connected to the network NW and controls the communication state.

The storage unit 22, for example, is configured by a hard disk drive or the like and stores various programs such as an operating system and an advertisement providing process program (including an information processing program according to the present invention). In addition, the advertisement providing process program, for example, may be downloaded from a predetermined server or the like through the network NW or may be recorded (recorded to be readable by using a computer) on a recording medium such as a compact disc (CD) or a digital versatile disc (DVD) and be read. Furthermore, in the storage unit 22, for example, an advertisement (advertisement data) provided from an advertiser is stored in association with an advertisement ID (an advertisement ID of the advertisement) identifying the advertisement.

In addition, in the storage unit 22, an advertisement database (DB) 221 is arranged. Here, the advertisement database 221 may be configured not to be arranged in the storage unit 22 but to be arranged in a server other than the advertisement processing server 2. In the advertisement database 221, an advertisement ID of an advertisement, an advertiser ID (an advertiser ID of an advertiser) identifying an advertiser, a bid amount of the advertisement, and commodity information of a commodity that is an advertisement target are registered in association with each other. Such information is an example of information of an advertisement. Here, the bid amount of an advertisement represents an amount designated by the advertiser for displaying the advertisement in an advertisement display area. In a case where the number of advertisement requests from advertisers is more than the number of advertisement display areas (advertisement frames), as the bid amount of an advertisement is higher, the advertisement may be determined more easily as an advertisement to be displayed in a corresponding advertisement display area. In addition, in the commodity information of a commodity that is an advertisement target, a commodity ID (a commodity ID of a commodity) identifying a commodity, a commodity classification, attributes, and attribute values of the commodity, and the like are included in association with each other. Here, the commodity classification of a commodity, for example, represents a category of a commodity. As examples of the commodity classification, there are "camera", "television set", "washer", "refrigerator", and the like. In addition, the commodity classification may be configured to be classified into a plurality of hierarchies from an upper hierarchy (higher level) to a lower hierarchy (lower level). The attribute of a commodity, for example, represents performance (property), a price range, and the like. For example, as examples of the attributes of the commodity classification "camera", there are pixels, zoom, a weight, a price range, and the like. In addition, the price range, for example, may be divided into a high price range, a middle price range, and a low price range. In addition, in the attributes of a commodity, a manufacturer of the commodity may be included. The attribute value of each attribute represents a specific value of the attribute. For example, as examples of the attribute value of the attribute "pixels", there are eight million, ten million, and the like. In addition, as examples of the attribute value of the attribute "price range", there are a low price range "1 to 19999", a middle price range "20000 to 39999", a high price range "40000 to 59999", and the like. Generally, the attribute values of such price ranges, for example, are different for each commodity classification.

The system control unit 24 is configured by a central processing unit (CPU) 24a, a read only memory (ROM) 24b, a random access memory (RAM) 24c, and the like. FIG. 3B is a diagram that illustrates an example of functional blocks of the system control unit 54. The system control unit 24 as a computer executes an advertisement providing process according to the advertisement providing process program stored in the storage unit 22. In such an advertisement providing process, the system control unit 24, as illustrated in FIG. 3B, serves as a keyword acquiring unit 241, a display target candidate selecting unit 242, a display target advertisement specifying unit 243, a display target advertisement determining unit 244, a display switching time setting unit 245, a display area occupancy ratio setting unit 246, an advertisement display control unit 247, and the like. Here, the keyword acquiring unit 241 is an example of a first acquiring means according to the present invention. The display target candidate selecting unit 242 is an example of a selecting means according to the present invention. In addition, the display target advertisement specifying unit 243 is an example of a specifying means according to the present invention. The display target advertisement determining unit 244 is an example of a determining means according to the present invention. The display switching time setting unit 245 and the display area occupancy ratio setting unit 246 correspond to an example of a setting means according to the present invention.

The keyword acquiring unit 241 acquires a keyword that is specified from a web page in which the advertisement display areas described above are arranged. Here, the keyword, for example, is a word that represents the category of a commodity.

The display target candidate selecting unit 242 selects advertisements corresponding to the keyword acquired by the keyword acquiring unit 241 from the advertisement database 221 as display target candidates. For example, advertisements of a commodity belonging to a commodity classification including the keyword are selected from the advertisement database 221.

The display target advertisement specifying unit 243 specifies display target advertisements to be displayed in the advertisement display areas of the web page among the display target candidates selected by the display target candidate selecting unit 242. For example, the display target advertisement specifying unit 243 specifies advertisements corresponding to the number of advertisement display areas arranged on the web page. In addition, in a case where the number of display target candidates selected by the display target candidate selecting unit 242 is more than the number of advertisement display areas, the display target advertisement specifying unit 243, for example, specifies display target candidates of higher bid amounts of advertisements or higher scores of advertisements as advertisements to be displayed in the advertisement display areas. Here, the score of an advertisement is calculated based on a keyword acquired by the keyword acquiring unit 241. For example, as an advertisement includes more keywords, the score thereof is higher. In addition, the score of an advertisement may be calculated by using a technique that is used when a search result is sorted and displayed using a general search engine.

In a case where a display target candidate, which has not been specified by the display target advertisement specifying unit 243, satisfies a predetermined condition among display target candidates of the same advertiser as that of the display target advertisement specified by the display target advertisement specifying unit 243, the display target advertisement determining unit 244 determines the display target candidate and the display target advertisements as display target advertisements to be displayed in the advertisement display areas. An example of the predetermined condition will be described later. A plurality of the display target advertisements (the display target advertisements of the same advertiser) determined by the display target advertisement determining unit 244, for example, is switched to be displayed in the same advertisement display area based on the display switching times. This display switching time corresponds to a display continuation time of an advertisement. Alternatively, the plurality of the display target advertisements determined by the display target advertisement determining unit 244 is displayed in the same advertisement display area, for example, based on the occupancy ratio of the advertisement display area. The display area is determined based on the occupancy ratio.

The display switching time setting unit 245, for example, sets display switching times based on a ratio among the bid amounts or the scores of the plurality of display target advertisements determined by the display target advertisement determining unit 244. In other words, the display switching time is set to be longer as the bid amount or the score of an advertisement is higher. Accordingly, the higher the input amount or the score of an advertisement is, the longer the display continuation time is, whereby the advertisement can be read by a reader for a longer time. Here, the display switching times may be configured not to be based on the ratio among the bid amounts or the scores of the plurality of display target advertisements but to be the same.

The display area occupancy ratio setting unit 246 sets the occupancy ratio of each advertisement display area, for example, based on the ratio among the bid amounts or the scores of the plurality of display target advertisements determined by the display target advertisement determining unit 244. In other words, the higher the bid amount or the score of an advertisement is, the higher the occupancy ratio of the advertisement display area is set. Accordingly, the higher the input amount or the score of an advertisement is, the larger the display area is, whereby the advertisement can be read more easily by the reader. Here, the occupancy ratios of the advertisement display area may be configured not to be based on the ratio between the bid amounts or the scores of the plurality of display target advertisements but to be the same.

The advertisement display control unit 247 supplies (transmits) the advertisements of commodities determined by the display target advertisement determining unit 244 to the web browser of the terminal Tn, thereby displaying the advertisements in the advertisement display areas of the web page.

In addition, the system control unit 24 has a function of receiving an advertisement bid through the terminal Tn of the advertiser and registering information relating to the bid advertisement in the advertisement database 221 in addition to the functions described above.

[2. Operation of Information Providing System S]

Figure 4:
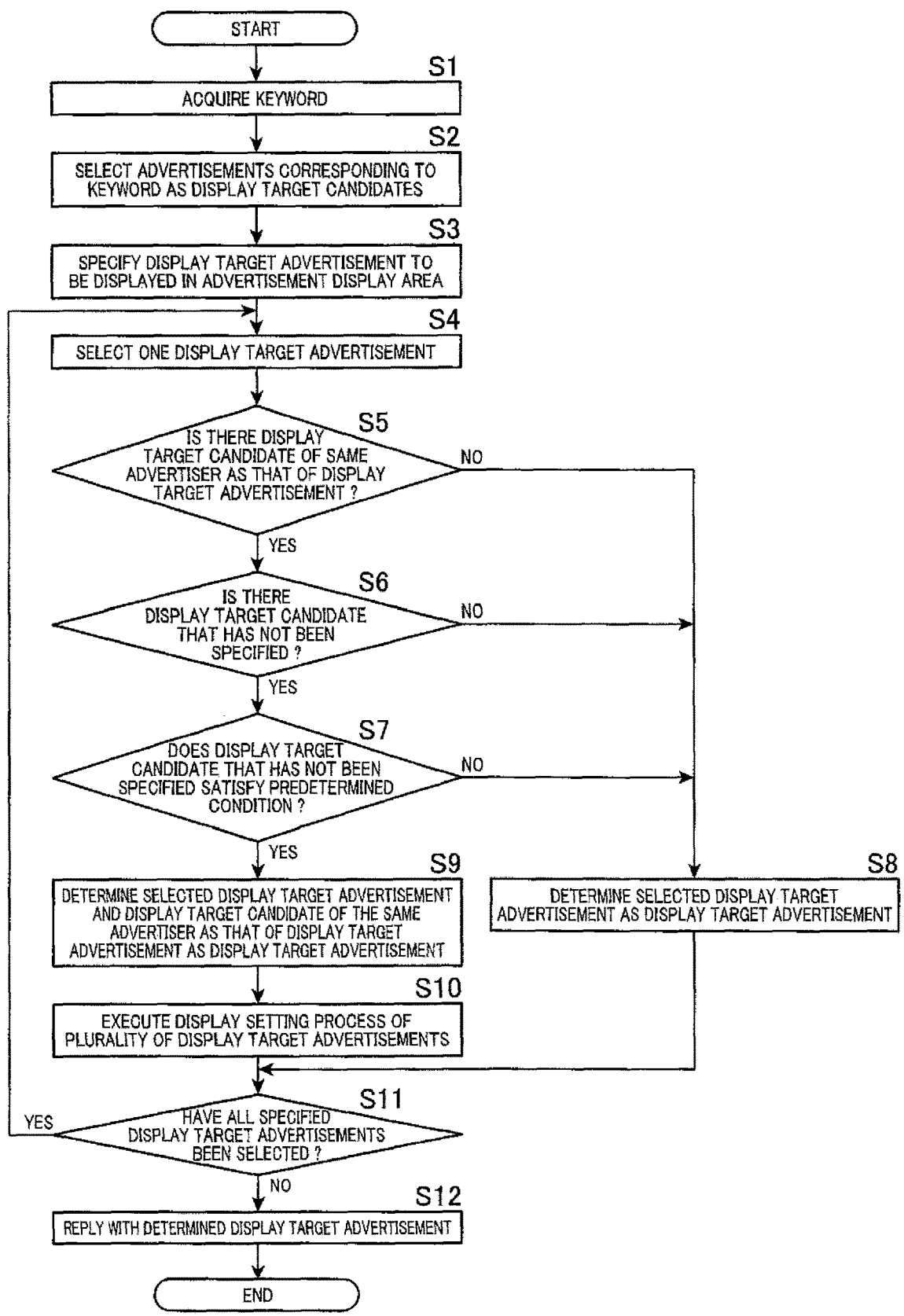
FIG. 4 is a flowchart that illustrates an example of an advertisement providing process executed by a system control unit 24 of the advertisement processing server 2.

Next, an example of the operation of the information providing system S according to this embodiment will be described with reference to FIG. 4. FIG. 4 is a flowchart that illustrates an example of the advertisement providing process executed by the system control unit 24 of the advertisement processing server 2. FIG. 4 is a flowchart that illustrates an example of the advertisement providing process executed by the system control unit 24 of the advertisement processing server 2. The process illustrated in FIG. 4, for example, is started in a case where the advertisement processing server 2 receives an advertisement distribution request transmitted from the terminal Tn through the network NW is received.

In addition, when a web page acquired from the information providing server 1 is displayed, the web browser of the terminal Tn executes a script embedded in the advertisement display areas of the web page, thereby acquiring articles described in predetermined article display areas or a keyword input to the keyword input field by the user. Then, the web browser accesses the advertisement processing server 2 through the network NW based on address information of the advertisement processing server 2 and transmits an advertisement distribution request to the advertisement processing server 2. In this advertisement distribution request, for example, articles or a keyword acquired by the web browser and the number (hereinafter, referred to as an "advertisement display area number") of advertisement display areas arranged on the web page are included. In addition, in a case where a plurality of article display areas is arranged on the web page, articles described in all the article display areas and the registration date and time of the articles may be configured to be included in the advertisement distribution request. Alternatively, in such a case, an article (in other words, a latest article) described in the article display area associated with the latest registration date and time or an article described in the article display area that is in the active state may be configured to be included in the advertisement distribution request.

When the process illustrated in FIG. 4 is started, the keyword acquiring unit 241 of the system control unit 24 acquires a keyword from the received advertisement distribution request (step S1). At this time, an advertisement display area number and the like are acquired as well. In addition, in a case where an article is included in the advertisement distribution request, the keyword acquiring unit 241, for example, acquires a keyword matching the commodity classification registered in a commodity classification list prepared in advance from the article included in the advertisement delivery request. In addition, in a case where a plurality of articles is included in the advertisement distribution request, for example, a keyword is acquired from an article associated with the latest registration date and time among the plurality of articles. Alternatively, in such a case, for example, among the plurality of articles, it may be configured such that a keyword is acquired from an article including more commodity IDs that appear more in the plurality of articles.

In addition, the keyword acquiring unit 241 may be configured to acquire keyword, which is extracted from the article by the web browser of the terminal Tn, from the terminal Tn. Alternatively, the keyword acquiring unit 241 may be configured to acquire a tag, which is extracted from the web page by the web browser of the terminal Tn, from the terminal Tn as a keyword. Alternatively, the keyword acquiring unit 241 may be configured to acquire a URL of the web page, which is acquired from the web page by the web browser of the terminal Tn, from the terminal Tn and acquire a keyword associated with the URL matching the URL registered in a URL-to-keyword association list prepared in advance.

Figure 5:
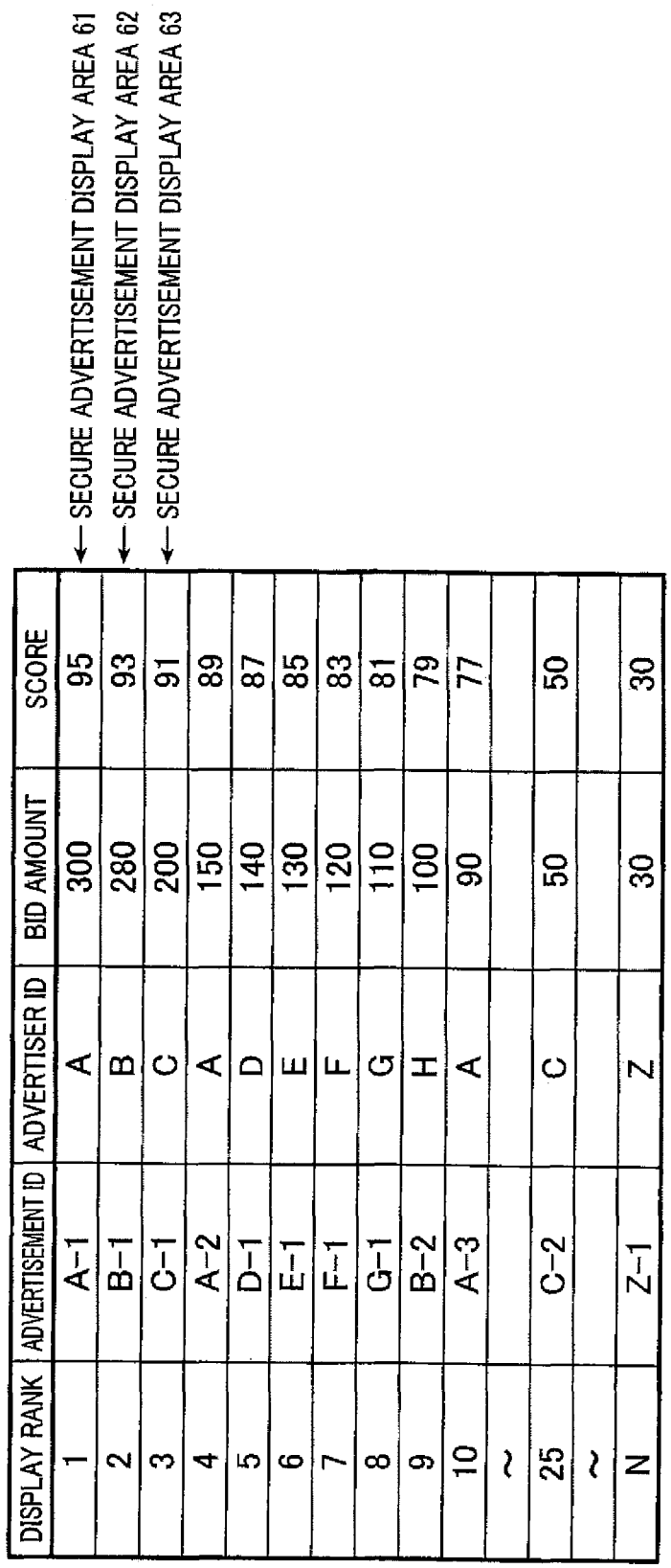
FIG. 5 is a diagram that illustrates an example of a list of display target candidates selected from an advertisement database 221.

Next, the display target candidate selecting unit 242 of the system control unit 24 selects advertisements corresponding to the keyword acquired in step S1 from the advertisement database 221 as display target candidates (step S2). FIG. 5 is a diagram that illustrates an example of a list of display target candidates selected from the advertisement database 221. In the example illustrated in FIG. 5, the selected display target candidates are advertisements relating to a commodity belonging to a commodity classification including the acquired keyword. In the list illustrated in FIG. 5, in addition to the advertisement ID, the advertiser ID, and the bid amount of the advertisement, the score of the advertisement and the display rank (display order in ranking) of the advertisement are represented. In addition, in the list illustrated in FIG. 5, for the convenience of description, the advertisement ID and the advertiser ID are represented using alphabets in a simple manner. Furthermore, in the example illustrated in FIG. 5, the ranking of the advertisement is in order of highest to lowest score of the advertisement and is also in order of highest to lowest bid amount of the advertisement. However, there are cases where the ranking based on the score of the advertisement and the ranking based on the bid amount of the advertisement are different from each other.

Next, the display target advertisement specifying unit 243 of the system control unit 24 specifies display target advertisements to be displayed in the advertisement display areas of the web page from among the display target candidates that are selected in step S2 (step S3). For example, the display target advertisement specifying unit 243 specifies advertisements having high display rank, which is based on the score or the input amount of the advertisement illustrated in FIG. 5, that correspond to the advertisement display area number acquired in step S1 as display target advertisements. In addition, for example, as illustrated in FIG. 2, in a case where there are three advertisement display areas, for the advertisement display areas, display target advertisements of which the advertisers are different from each other may be configured to be specified, or display target advertisements of the advertisers are the same may be configured to be specified. As an example in which display target advertisements of which the advertisers are different from each other are specified, for example, an advertisement "A-1" is specified as a display target advertisement for the advertisement display area 61 illustrated in FIG. 2, an advertisement "B-1" is specified as a display target advertisement for the advertisement display area 62 illustrated in FIG. 2, and an advertisement "C-1" is specified as a display target advertisement for the advertisement display area 63 illustrated in FIG. 2. In addition, the display target advertisement specifying unit 243 of the system control unit 24, instead of specifying display target advertisements corresponding to the advertisement display area number once in step S3, may be configured to determine whether or not there is a display target candidate of the same advertiser as that of the display target advertisement every time when one display target advertisement to be displayed in the advertisement display area of the web page is specified among the display target candidates selected in step S2 and execute the process of steps S6 to S10 to be described later.

Next, the display target advertisement determining unit 244 of the system control unit 24 selects one display target advertisement specified in step S3 (step S4). Next, the display target advertisement determining unit 244 of the system control unit 24 determines whether or not there is a display target candidate (the advertisement selected in step S2) of the same advertiser as that of the display target advertisement selected in step S4 (step S5). Then, in a case where it is determined that there is a display target candidate of the same advertiser as that of the display target advertisement selected in step S4 (Yes in step S5), the process proceeds to step S6. On the other hand, in a case where it is determined that there is no display target candidate of the same advertiser as that of the display target advertisement selected in step S4 (No in step S5), the process proceeds to step S8.

In step S6, the display target advertisement determining unit 244 of the system control unit 24 determines whether or not there is a display target candidate that has not been specified in step S3 among the display target candidates of the same advertiser as that of the display target advertisement selected in step S4. For example, in the example illustrated in FIG. 5, when the advertisement "A-1" is selected as a display target advertisement in step S4, display target candidates of the same advertiser "A" as that of the display target advertisement are the advertisement "A-2" and the advertisement "A-3". Then, in a case where it is determined that there is a display target candidate that has not been specified in step S3 among the display target candidates of the same advertiser as that of the display target advertisement selected in step S4 (Yes in step S6), the process proceeds to step S7. On the other hand, in a case where it is determined that there is no display target candidate that has not been specified in step S3 among the display target candidates of the same advertiser as that of the display target advertisement selected in step S4 (No in step S6), the process proceeds to step S8.

In step S7, the display target advertisement determining unit 244 of the system control unit 24 determines whether or not the display target candidate that has not been specified in step S3 satisfies a predetermined condition. This predetermined condition is a condition for displaying an advertisement (in other words, originally, an advertisement not displayed in the advertisement display area) not specified as the display target advertisement in step S3 in the same advertisement display area as that of the display target advertisement of the same advertiser. As examples of the determination, there are the following [Determination Example 1] to [Determination Example 4]. In addition, in a case where there is a plurality of display target candidates that have not been specified in step S3 among the display target candidates of the same advertiser as that of the display target advertisement, it is determined whether or not each of the display target candidates satisfies a predetermined condition.

Determination Example 1

In this case, in a case where a display target candidate that has not been specified in step S3 is another advertisement displayed in an advertisement display area different from the advertisement display area in which the display target advertisement of the same advertiser as that of the display target candidate is displayed and satisfies a condition that the display target candidate is in a competitive relation with another advertisement of another advertiser different from the advertiser of the display target candidate, the display target advertisement determining unit 244 determines that the display target candidate that has not been specified in step S3 satisfies the predetermined condition described above.

For example, in the example illustrated in FIG. 5, the advertisement "A-1" of the advertiser "A" is specified as a display target advertisement to be displayed in the advertisement display area 61 illustrated in FIG. 2, and another advertisement "B-1" of the advertiser "B" is specified as a display target advertisement to be displayed in the advertisement display area 62 illustrated in FIG. 2. In addition, the advertisement "A-2" of the advertiser "A" is a display target candidate that has not been specified in step S3. In such a case, in a case where the condition that the advertisement "A-2" is in a competitive relation with the advertisement "B-1" is satisfied, it is determined that that advertisement "A-2" satisfies the predetermined condition described above. The reason for this is that, for example, in a case where the advertisement "A-2" is in the competitive relation with the advertisement "B-1", but the advertisement "A-2" is not displayed, there is a remarkable disadvantage for the advertiser of the advertisement "A-2". According to such a configuration, in a case where an advertisement that is in the competitive relation with an advertisement that has not been specified as a display target advertisement is specified as a display target advertisement, the occurrence of a disadvantage according to no-display of the advertisement that has not been specified can be prevented. Here, the condition of being in the competitive relation includes at least one of conditions represented in the following conditions of (a) to (c). According to such conditions, the range of the competitive relation can be limited.

(a) a condition that the rank of the another advertisement (for example, the advertisement "B-1"), which is ranked based on a predetermined sorting criterion), is higher than that of the display target candidate (for example, the advertisement "A-2")

Here, the "predetermined sorting criterion" is a sorting criterion different from the bid amount of the advertisement or the score of the advertisement, and, as examples of the sorting criterion, for example, there are an attention level of a commodity relating to the advertisement, the number of sold commodities, the sales amount of the commodity, and the like. For example, in a case where the rank (for example, order in the ranking based on the attention level) of the advertisement "B-1" is lower than that of the advertisement "A-2", for example, the attention level of the advertisement "A-2" is higher than that of the advertisement "B-1", and accordingly, the disadvantage of a case where the advertisement "A-2" is not displayed is considered to be small, and, in such a case, no competitive relation is regarded.

(b) a condition that a difference between the rank of the another advertisement (for example, the advertisement "B-1"), which is ranked based on a predetermined sorting criterion, and the rank of the display target candidate (for example, the advertisement "A-2") is within a predetermined rank difference (for example, a rank difference of ten)

For example, in a case where there is a large difference between the rank of the advertisement "B-1" and the rank of the advertisement "A-2" (for example, the rank of the advertisement "B-1" is the third, and the rank of the advertisement "A-2" is the 100th), basically, the advertisements are considered not to be comparison targets, and, in such a case, no competitive relation is regarded.

(c) a condition that the price range of a commodity that is the target for the another advertisement (for example, the advertisement "B-1") and the price range of a commodity that is the target for the display target candidate (for example, the advertisement "A-2") are the same For example, in a case where the price range of the commodity that is the target for the advertisement "B-1" and the price range of a commodity that is the target for the advertisement "A-2" are different from each other (for example, the price range of the advertisement "B-1" is the high price range "40000 to 59999), and the price range of the advertisement "A-2" is the middle price range "20000 to 39999"), basically, the advertisements are considered not to be comparison targets, and, in such a case, no competitive relation is regarded. In addition, the attribute value other than the price range of the commodity may be used. For example, in the case of the commodity classification "camera", a condition that the number of pixels of a commodity that is the target for the another advertisement (for example, the advertisement "B-1") and the number of pixels of a commodity that is the target for the display target candidate (for example, the advertisement "A-2") are the same, or a difference between the numbers of the pixels is within a threshold may be configured to be included in the competitive condition.

For example, by configuring the condition of the competitive relation to be determined to be satisfied in a case where all the conditions represented in (a) to (c) described above are satisfied, the range of the competitive relation can be further limited.

Determination Example 2

In this case, in a case where a condition that the rank of the display target candidate (a display target candidate that has not been specified in step S3), which is ranked based on a predetermined sorting criterion, is within a predetermined rank (for example, the 100th rank) is satisfied, the display target advertisement determining unit 244 determines that the display target candidate (the display target candidate that has not been specified in step S3) satisfies the predetermined condition described above. Here, as examples of the "predetermined sorting criterion", there are a bid amount of an advertisement, a score of an advertisement, an attention level of a commodity relating to the advertisement, the number of sold commodities, the sales amount of the commodity, and the like. Advertisements of commodities of a predetermined rank or higher in the ranking based on the sorting criterion can be displayed with higher priority.

Determination Example 3

In this case, in a case where a condition that a difference between the score of a display target advertisement specified in step S3 and the score of a display target candidate that has not been specified in step S3 is within a predetermined value (for example, 40) is satisfied, the display target advertisement determining unit 244 determines that the display target candidate (the display target candidate that has not been specified in step S3) satisfies the predetermined condition described above.

For example, in the example illustrated in FIG. 5, the advertisement "A-1" of the advertiser "A" is specified as a display target advertisement to be displayed in the advertisement display area 61 illustrated in FIG. 2, another advertisement "B-1" of the advertiser "B" is specified as a display target advertisement to be displayed in the advertisement display area 62 illustrated in FIG. 2, and another advertisement "C-1" of the advertiser "C" is specified as a display target advertisement to be displayed in the advertisement display area 63 illustrated in FIG. 2. In addition, a display target candidate that has not been specified in step S3 is assumed to be the advertisement "A-2". In such a case, in a case where the condition that a difference between the score of the advertisement "B-1" or "C-1" and the score of the advertisement "A-2" is within the predetermined value is satisfied, the advertisement "A-2" is determined to satisfy the predetermined condition described above. In addition, based on a difference between the scores of both advertisements (advertisements "B-1" and "A-2" or advertisements "C-1" and "A-2") of mutually-different advertisers, it is determined whether the advertisement "A-2" is displayed in the advertisement display area. In this way, the lower limit of the ranks of the display target candidates that can be displayed among the rankings based on the scores of advertisements can be appropriately set. In addition, it may be configured such that whether or not the advertisement "A-2" is displayed in the advertisement display area is determined based on a difference between the scores of both advertisements (advertisements "A-1" and "A-2") of the same advertiser.

In addition, it may be configured to such that whether or not a difference between the score of a display target advertisement (for example, the advertisement "C-1") of which the score is the lowest among the specified display target advertisements and the score of the display target candidate (for example, the advertisement "A-2") that has not been specified in step S3 is determined to be within a predetermined value. According to such a configuration, the lower limit of the ranks of the display target candidates that can be displayed among the rankings based on the scores of the advertisements can be appropriately set.

In addition, as in the example illustrated in FIG. 5, in a case where a plurality of display target advertisements is specified in step S3, it may be configured such that the display target candidate that has not been specified in step S3 is determined to satisfy the predetermined condition in a case where a condition that a difference between an average score of the scores of the plurality of display target advertisements (for example, advertisements "A-1", "B-1", and "C-1") and the score of the display target candidate (for example, the advertisement "A-2") that has not been specified in step S3 is within a predetermined value is satisfied. According to such a configuration, the lower limit of the ranks of the display target candidates that can be displayed among the rankings based on the scores of the advertisements can be appropriately set.

Determination Example 4

In this case, in a case where a condition that a difference between the bid amount of the display target advertisement specified in step S3 and the bid amount of a display target candidate that has not been specified in step S3 is within a predetermined amount is satisfied, the display target advertisement determining unit 244 determines that the display target candidate that has not been specified in step S3 satisfies the predetermined condition described above. Accordingly, the lower limit of the ranks of the display target candidates that can be displayed among the rankings based on the bid amounts of the advertisements can be appropriately set. In such a case, it is preferable that whether or not the display target candidate (the display target candidate that has not been specified in step S3) is displayed in the advertisement display area is determined based on a difference between the bid amounts of both advertisements of mutually-different advertisers. The reason for this is that, according to the configuration in which it is determined based on a difference between bid amounts of both advertisements ("A-1" and "A-2") of the same advertiser whether or not the advertisement "A-2" is displayed in the advertisement display area, there is a possibility that the advertiser can adjust the difference between the bid amounts of both the advertisements. In addition, it may be configured such that whether or not a difference from a bid amount of the display target advertisement having the lowest bid amount among the specified display target advertisements is within a predetermined amount is determined. According to such a configuration, the lower limit of the ranks of the display target candidates that can be displayed among the rankings based on the bid amounts of the advertisements can be appropriately set.

In addition, in a case where a plurality of display target advertisements is specified in step S3, in a case where a condition that a difference between the average bid amount of bid amounts of the plurality of display target advertisements and a bid amount of the display target candidate that has not been specified in step S3 is within a predetermined amount is satisfied, it may be configured such that the display target candidate that has not been specified in step S3 is determined to satisfy the predetermined condition. According to such a configuration, the lower limit of the ranks of the display target candidates that can be displayed among the rankings based on the bid amounts of the advertisements can be appropriately set.

In addition, there are cases where the bid amount of the display target candidate that has not been specified in step S3 is changed from its initial value. For example, in the example illustrated in FIG. 5, while the bid amount of the advertisement "A-2" is "150", in order to determine the advertisement as a display target advertisement, the bid amount is set to be the bid amount "200" of the display target advertisement "C-1" or more. In other words, there are cases where "50" or more is requested to be added to the initial value of the bid amount. In such a case, the advertiser may set the upper limit of the added amount. The amount (upper limit) set as such will be referred to as a "set amount". In this case, in a case where a condition that a difference between the bid amount of the display target advertisement specified in step S3 and the bid amount of the display target candidate that has not been specified in step S3 is within the set amount is satisfied, the display target advertisement determining unit 244 determines that the display target candidate that has not been specified in step S3 satisfies the predetermined condition described above. In other words, in a case where the bid amount difference exceeds the set amount set by the advertiser, it is determined that the predetermined condition described above is not satisfied. In addition, also in this case, as described above, in a case where a condition that an average bid amount of the bid amounts of a plurality of display target advertisements and the bid amount of the display target candidate that has not been specified in step S3 is within the set amount is satisfied, it may be configured such that the display target candidate that has not been specified in step S3 is determined to satisfy the predetermined condition described above.

While any one of [Determination Example 1] to [Determination Example 4] described above may be independently executed, the display target candidate that has not been specified in step S3 may be determined to satisfy the predetermined condition described above in a case where two or more of [Determination Example 1] to [Determination Example 4] are executed, and the conditions are satisfied (in other words, a case where an AND condition of two or more determinations is satisfied).

Then, in a case where it is determined that the display target candidate that has not been specified in step S3 does not satisfy the predetermined condition (in a case where there is a plurality of display target candidates, none of the display target candidates satisfies the predetermined condition) (No in step S7), the process proceeds to step S8. On the other hand, in a case where it is determined that the display target candidate that has not been specified in step S3 satisfies the predetermined condition (in a case where there is a plurality of display target candidates, at least one display target candidate satisfies the predetermined condition) (No in step S7), the process proceeds to step S9.

In step S8, the display target advertisement determining unit 244 of the system control unit 24 determines the display target advertisement selected in step S4 as a display target advertisement to be displayed in the advertisement display area, and the process proceeds to step S11. On the other hand, in step S9, the display target advertisement determining unit 244 of the system control unit 24 determines the display target advertisement selected in step S4 and one or more display target candidates that are advertisements of the same advertiser as that of the display target advertisement and are determined to satisfy the predetermined condition described above as display target advertisements to be displayed in the advertisement display areas, and the process proceeds to step S10.

In step S10, a display setting process of a plurality of the display target advertisements is executed. In this display setting process, for example, the display switching time setting unit 245 of the system control unit 24 sets each display switching time based on the ratio among the bid amounts or the scores of the plurality of display target advertisements determined in step S11. For example, it is assumed that the advertisement "A-1" and the advertisement "A-2" are determined as display target advertisements to be displayed in the advertisement display area 61 illustrated in FIG. 2. In such a case, in the example illustrated in FIG. 5, since the bid amount of the advertisement "A-1" is "300", and the bid amount of the advertisement "A-2" is "150", the ratio between the bid amounts is "2:1". Thus, the display switching time of the advertisement "A-1" is set to "10 seconds", and the display switching time of the advertisement "A-2" is set to "5 seconds". Alternatively, in the display setting process, for example, the display area occupancy ratio setting unit 246 of the system control unit 24 sets occupancy ratio of the advertisement display area based on the ratio between the bid amounts or the scores of the plurality of display target advertisements determined in step S11. For example, as described above, it is assumed that the advertisement "A-1" and the advertisement "A-2" are determined as display target advertisements to be displayed in the advertisement display area 61 illustrated in FIG. 2. In such a case, in the example illustrated in FIG. 5, since the ratio between the bid amounts is "2:1", the occupancy ratio of the advertisement display area of the advertisement "A-1" is set to "⅔", and the occupancy ratio of the advertisement display area of the advertisement "A-2" is set to "⅓".

In step S11, the system control unit 24 determines whether or not all the display target advertisements specified in step S3 have been selected in step S4. Then, in a case where all the display target advertisements are determined not to have been selected (No in step S11), the process is returned to step S4, and one of display target advertisements that have not been selected is selected, and the process of step S5 and subsequent steps is executed. On the other hand, in a case where the display target advertisements are determined to have been selected (Yes in step S11), the process proceeds to step S12.

In step S12, the advertisement display control unit 247 of the system control unit 24 displays the display target advertisement (advertisement data) determined in step S8 or step S9 in the advertisement display area by replying with (transmitting) the display target advertisement to the web browser of the terminal Tn. In addition, in a case where a plurality of display target advertisements determined in step S9 is displayed in the advertisement display area, information representing the display switching times or the occupancy ratios of the advertisement display area set in step S10 is transmitted to the web browser of the terminal Tn. Alternatively, a script causing the web browser to execute a switched display based on the display switching time of each display target advertisement or a script causing the web browser to execute a divisional display based on the occupancy ratio of the advertisement display area of each display target advertisement is transmitted to the web browser of the terminal Tn. Accordingly, the web browser of the terminal Tn executes the switched display of the display target advertisements for the advertisement display area of the web page based on each display switching time as time elapses. Alternatively, the web browser of the terminal Tn executes the divisional display of the display target advertisements for the advertisement display area of the web page based on each occupancy ratio.

As described above, according to the embodiment described above, in a case where an advertisement distribution request is received from the terminal Tn, the advertisement processing server 2 acquires a keyword specified from the web page displayed on the terminal Tn, selects advertisements corresponding to the keyword from the advertisement database 221 as display target candidates, and specifies a display target advertisement to be displayed in the advertisement display area of the web page from among the display target candidates. Then, in a case where the display target candidate that has not been specified as the display target advertisement among the display target candidates of the same advertiser as that of the specified display target advertisement satisfies a predetermined condition, the advertisement processing server 2 is configured to determine the display target candidate and the display target advertisement as display target advertisements to be displayed in the advertisement display area, and accordingly, the advertisement frame secured by the advertiser can be effectively used.

In addition, in the embodiment described above, while the information providing server 1 and the advertisement processing server 2 are configured as independent hardware, the function of the information providing server 1 may be configured to be embedded in the advertisement processing server 2. In such a case, in a case where there is a request of a web page from the terminal Tn, the advertisement processing server 2 embeds the display target advertisement for which the process illustrated in FIG. 4 is determined to be executed in the advertisement display area and transmits a web page in which the display target advertisement is embedded to the terminal Tn.

In addition, in this embodiment, while the advertisement processing server 2 is configured to execute the advertisement providing process illustrated in FIG. 4, as another example, the terminal Tn may be configured to execute the advertisement providing process (in other words, the terminal Tn serves as an information processing device according to the present invention). In case of such a configuration, the information processing program according to the present invention is installed to the terminal Tn. Then, the terminal Tn (a CPU as an acquiring means) acquires a keyword, for example, input to a keyword input field of a web page provided from an information search site or a keyword input field of a tool bar installed to an upper portion of the display screen of the terminal Tn. Next, the terminal Tn (a CPU as a selecting means), by using a method similar to the process illustrated in FIG. 4, selects advertisements corresponding to the acquired keyword from a storing means (a hard disk of the terminal Tn or the like) storing information of each of a plurality of advertisements as display target candidates. In this storing means, the information of the advertisements that is acquired at predetermined timing from the advertisement processing server 2 is stored. Next, the terminal Tn (a CPU as a specifying means), by using a method similar to the process illustrated in FIG. 4, specifies a display target advertisement to be displayed in the advertisement display area of the web page from among the selected display target candidates. Next, in a case where the display target candidate that has not been specified as the display target advertisement among the display target candidates of the same advertiser as that of the specified display target advertisement satisfies a predetermined condition, the terminal Tn (a CPU as a determining means), by using a method similar to the process illustrated in FIG. 4, determines the display target candidate and the display target advertisement as display target advertisements to be displayed in the advertisement display area. Next, the terminal Tn (a CPU as a setting means), by using a method similar to the process illustrated in FIG. 4, sets each display switching time based on the ratio among the bid amounts or the scores of the plurality of the display target advertisements that has been determined as above. Alternatively, the terminal Tn (a CPU as a setting means), by using a method similar to the process illustrated in FIG. 4, sets each occupancy ratio of the advertisement display area based on the ratio of the bid amounts or the scores of the plurality of the display target advertisements that has been determined as above. Then, the terminal Tn executes a switched display of the display target advertisements for the advertisement display area of the web page based on each display switching time as the time elapses. Alternatively, the terminal Tn executes a divisional display of the display target advertisements for the advertisement display area of the web page based on the occupancy ratio. In addition, in such a case, the information processing program installed to the terminal Tn, for example, may be downloaded from a predetermined server or the like through the network NW or may be recorded on a recording medium such as a CD or a DVD and read therefrom. Furthermore, as another example, the information processing program according to the present invention, for example, may be configured to be described as a script within a structured document configuring the web page, and the script may be executed by the web browser (in case of such a configuration, the terminal Tn serves as an information processing device according to the present invention).

REFERENCE SIGN LIST

1 Information providing server
2 Advertisement processing server
21 Communication unit
22 Storage unit
23 Input/output interface unit
24 System control unit
Tn Terminal
NW Network
S Information providing system

The invention claimed is:
1. An information processing device comprising:
at least one memory operable to store computer program code; and
at least one processor operable to access said program code and operate according to said program code, said program code including:
acquiring code configured to cause at least one of said at least one processor to acquire a keyword specified from a Web page on which one or more advertisement frames are arranged, wherein the one or more advertisement frames include a first advertisement frame, said web page being transmitted from a server to a terminal device through a network, and being displayed on a display screen of the terminal device,
selecting code configured to cause at least one of said at least one processor to select advertisements corresponding to the acquired keyword as a set of candidate advertisements from a database which stores at least an advertisement ID of each advertisement in the database, an advertiser ID of each advertiser of a plurality of advertisers, each advertisement provided by an advertiser of the plurality of advertisers, and commodity information for each advertisement in the database,
specifying code configured to cause at least one of said at least one processor to specify, according to a first criterion and at a first time, a first advertisement to be displayed in the first advertisement frame so as to control the terminal to, at a display switching time, display a second advertisement in the first advertisement frame, wherein the first advertisement and the second advertisement are from among the set of candidate advertisements, wherein the first advertisement is of a first advertiser of the plurality of advertisers, wherein the specifying code is further configured to cause at least one of said at least one processor to specify, according to a second criterion and at a second time after the first time, wherein the first time and the second time refer to times of advertisement specification and the display switching time refers to a display interval, the second advertisement to be displayed in the first advertisement frame by the terminal, from among the set of candidate advertisements excluding the first advertisement, wherein the second advertisement is of a second advertiser of the plurality of advertisers, and wherein the second criterion is different from the first criterion and requires:

i) the second advertiser is of a same advertiser as the first advertiser, and ii) the second advertisement satisfies a predetermined condition, and advertisement display control code configured to cause at least one of said at least one processor to control a display of the first advertisement on the display screen of the terminal device in the first advertisement frame and to control a display of the second advertisement on the display screen of the terminal device in the first advertisement frame, thereby displaying different advertisements of the same advertiser for the acquired keyword, wherein the different advertisements are displayed in the first advertisement frame, and thereby effectively using the first advertisement frame on behalf of the same advertiser.

2. The information processing device according to claim 1, wherein the specifying code is further configured to cause at least one of said at least one processor to specify a third advertisement, from among the set of candidate advertisements excluding the first advertisement and the second advertisement, as another advertisement to be displayed in a second advertisement frame different from the first advertisement frame wherein the third advertisement satisfies a condition of being in a competitive relation with the first advertisement, wherein the competitive relation indicates that a price range of a third commodity of the third advertisement and a first commodity of the first advertisement are the same, wherein the one or more advertisement frames include the second advertisement frame.

3. The information processing device according to claim 2, wherein, the second advertisement is included in the first advertisement frame only when the condition of the another advertisement being in the competitive relation is satisfied.

4. The information processing device according to claim 2, wherein, only when the condition of being in the competitive relation is satisfied, a condition that a difference between a rank of the another advertisement, which is ranked based on a predetermined sorting criterion, and a rank of the second advertisement is within a predetermined rank difference is included.

5. The information processing device according to claim 2, wherein, only when the condition of being in the competitive relation is satisfied, a condition that a price range of a commodity that is a target for the another advertisement and a price range of a commodity that is a target for the second advertisement are the same as each other is included.

6. The information processing device according to claim 2, wherein the first advertisement and the second advertisement are ranked based on a predetermined sorting criterion, and the predetermined condition includes a rank of the first advertisement and a rank of the second advertisement being within a predetermined range.

7. The information processing device according to claim 2, wherein a first score calculated based on the keyword is associated with the first advertisement and a second score calculated based on the keyword is associated with the second advertisement, and the predetermined condition includes a difference between the first score and the second score being within a predetermined range.

8. The information processing device according to claim 2, wherein the predetermined condition includes a difference between a bid amount of the first advertisement and a bid amount of a second advertisement being within a predetermined amount.

9. The information processing device according to claim 2, wherein the information processing device further comprises setting code configured to cause at least one of said at least one processor to set the display switching time based on a ratio among bid amounts of the first advertisement and the second advertisement.

10. The information processing device according to claim 2, wherein the information processing device further comprises setting code configured to cause at least one of said at least one processor to set the display switching time based on a ratio among scores, wherein the scores are associated with the keyword.

11. The information processing device according to claim 2, wherein the first advertisement and the second advertisement are displayed in the first advertisement frame in a divisional manner based on occupancy ratios of an advertisement display area of the display screen, and the information processing device further comprises setting code configured to cause at least one of said at least one processor to set occupancy ratios of the first advertisement frame based on a ratio among bid amounts associated with the first advertisement and the second advertisement.

12. The information processing device according to claim 2, wherein the first advertisement and the second advertisement are displayed in the first advertisement frame in a divisional manner based on occupancy ratios of the first advertisement frame, and the information processing device further comprises setting code configured to cause at least one of said at least one processor to set occupancy ratios of the first advertisement frame based on a ratio among scores, which are calculated based on the keyword, and associated with the first advertisement and the second advertisement.

13. The information processing device according to claim 1,
wherein the first advertisement and the second advertisement are ranked based on a predetermined sorting criterion, and
the predetermined condition includes a rank of the first advertisement and a rank of the second advertisement being within a predetermined range.

14. The information processing device according to claim 1,
wherein a first score calculated based on the keyword is associated with the first advertisement and a second score calculated based on the keyword is associated with the second advertisement, and
the predetermined condition includes a difference between the first score and the second score being within a predetermined range.

15. The information processing device according to claim 1,
wherein the predetermined condition includes a difference between a bid amount of the first advertisement and a bid amount of a second advertisement being within a predetermined amount.

16. The information processing device according to claim 1,
wherein the information processing device further comprises setting code configured to cause at least one of said at least one processor to set the display switching time based on a ratio among bid amounts of the first advertisement and the second advertisement.

17. The information processing device according to claim 1,
wherein the information processing device further comprises setting code configured to cause at least one of said at least one processor to set the display switching time based on a ratio among scores, wherein the scores are associated with the keyword.

18. The information processing device according to claim 1,
wherein the first advertisement and the second advertisement are displayed in the first advertisement frame in a divisional manner based on occupancy ratios of the first advertisement frame, and
the information processing device further comprises setting code configured to cause at least one of said at least one processor to set occupancy ratios of the first advertisement frame based on a ratio among bid amounts associated with the first advertisement and the second advertisement.

19. The information processing device according to claim 1,
wherein the first advertisement and the second advertisement are displayed in the first advertisement frame in a divisional manner based on occupancy ratios of the first advertisement frame, and
the information processing device further comprises setting code configured to cause at least one of said at least one processor to set occupancy ratios of the first advertisement frame based on a ratio among scores, which are calculated based on the keyword, and associated with the first advertisement and the second advertisement.

20. The information processing device according to claim 1, wherein the one or more advertisement frames include a second advertisement frame different from the first advertisement frame.

21. An information processing method executed by a computer, the information processing method comprising:
acquiring a keyword specified from a Web page on which one or more advertisement frames used for displaying an advertisement are arranged, wherein the one or more advertisement frames include a first advertisement frame, said web page being transmitted from a server to a terminal device through a network, and being displayed on a display screen of the terminal device;
selecting advertisements corresponding to the acquired keyword as a set of candidate advertisements, from a database which stores at least an advertisement ID of each advertisement in the database, an advertiser ID of each advertiser of a plurality of advertisers, each advertisement provided by an advertiser of the plurality of advertisers, and commodity information for each advertisement in the database;
specifying, according to a first criterion and at a first time, a first advertisement to be displayed in the first advertisement frame so as to control the terminal to, at a display switching time, display a second advertisement in the first advertisement frame, wherein the first advertisement and the second advertisement are from among the set of candidate advertisements, wherein the first advertisement is of a first advertiser of the plurality of advertisers;
specifying, according to a second criterion and at a second time after the first time, wherein the first time and the second time refer to times of advertisement specification and the display switching time refers to a display interval, the second advertisement to be displayed in the first advertisement frame, from among the set of candidate advertisements excluding the first advertisement, wherein the second advertisement is of a second advertiser of the plurality of advertisers, and wherein the second criterion is different from the first criterion and requires:
i) the second advertiser is of a same advertiser as the first advertiser, and
ii) the second advertisement satisfies a predetermined condition;
controlling a display of the first advertisement on the display screen of the terminal device in the first advertisement frame; and
controlling a display of the second advertisement on the display screen of the terminal device in the first advertisement frame, thereby displaying different advertisements of the same advertiser for the acquired keyword, wherein the different advertisements are displayed in the first advertisement frame, and thereby effectively using the first advertisement frame on behalf of the same advertiser.

22. An information processing device comprising:
at least one memory operable to store computer program code; and
at least one processor operable to access said program code and operate according to said program code, said program code including:
acquiring code configured to cause at least one of said at least one processor to acquire a keyword specified from a Web page on which one or more advertisement frames are arranged, wherein the one or more advertisement frames include a first advertisement frame, said web page being transmitted from a server to a terminal device through a network, and being displayed on a display screen of the terminal device, selecting code configured to cause at least one of said at least one processor to select advertisements corresponding to the acquired keyword as candidate advertisements, from a database which stores at least an advertisement ID of each advertisement in the database, an advertiser ID of each advertiser of a plurality of advertisers, each advertisement provided by an advertiser of the plurality of advertisers, and commodity information for each advertisement in the database, specifying code configured to cause at least one of said at least one processor to specify, according to a first criterion and at a first time, a first advertisement to be displayed in the first advertisement frame so as to control the terminal to, at a display switching time, display a second advertisement in the first advertisement frame, wherein the first advertisement and the second advertisement are from among the set of candidate advertisements, wherein the first advertisement is of a first advertiser of the plurality of advertisers, identifying code configured to cause at least one of said at least one processor to attempt to identify, according to a second criterion and at a second time after the first time wherein the first time and the second time refer to times of advertisement specification and the display switching time refers to a display interval, the second advertisement to be displayed in the first advertisement frame, from among the set of candidate advertisements excluding the first advertisement, wherein the second advertisement is of a second advertiser of the plurality of advertisers, and wherein the second criterion is different from the first criterion and requires:

i) the second advertiser is of a same advertiser as the first advertiser, and ii) the second advertisement satisfies a predetermined condition, and advertisement display control code configured to cause at least one of said at least one processor when the attempt to identify the second advertisement is not successful, to control a display of only the first advertisement on the display screen of the terminal device in the first advertisement frame, and when the second advertisement is identified, to control a display of the first advertisement on the display screen of the terminal device in the first advertisement frame and to control a display of the second advertisement on the display screen of the terminal device in the first advertisement frame, thereby displaying different advertisements of the same advertiser for the acquired keyword, wherein the different advertisements are displayed in the first advertisement frame, and thereby effectively using the first advertisement frame on behalf of the same advertiser.

* * * * *